(12) United States Patent
Ahnn et al.

(10) Patent No.: US 11,726,819 B2
(45) Date of Patent: *Aug. 15, 2023

(54) TOOL FOR VIEWING JOBS MANAGED BY HETEROGENEOUS JOB SCHEDULERS

(71) Applicant: Target Brands, Inc., Minneapolis, MN (US)

(72) Inventors: Jonghoon Joey Ahnn, San Francisco, CA (US); Gaurav Gupta, Union City, CA (US); Prashanth Sandela, San Francisco, CA (US); Praveen Kumar Thota, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,556

(22) Filed: Apr. 25, 2022

(65) Prior Publication Data
US 2022/0244991 A1    Aug. 4, 2022

Related U.S. Application Data

(63) Continuation of application No. 16/741,548, filed on Jan. 13, 2020, now Pat. No. 11,340,941.

(51) Int. Cl.
*G06F 9/48* (2006.01)
*G06F 16/951* (2019.01)
(Continued)

(52) U.S. Cl.
CPC .......... *G06F 9/4881* (2013.01); *G06F 16/951* (2019.01); *G06F 3/0482* (2013.01); *G06F 3/04847* (2013.01); *G06F 2209/482* (2013.01)

(58) Field of Classification Search
CPC ............ G06F 11/3409; G06F 11/3414; G06F 11/3495; G06F 9/4881; G06F 9/4887;
(Continued)

(56) References Cited

U.S. PATENT DOCUMENTS 5,918,226 A      6/1999  Tarumi et al.
7,529,408 B2 *   5/2009  Vohariwatt ........... G06V 30/416
                                                       399/361
(Continued)

FOREIGN PATENT DOCUMENTS

CN          107220297 A      9/2017

*Primary Examiner* — Andrew L Tank
(74) *Attorney, Agent, or Firm* — Merchant & Gould P.C.

(57) ABSTRACT

The present disclosure is directed to a system and method for viewing jobs managed by heterogeneous job schedulers on heterogeneous computing systems. Organizations often rely on workflow schedulers or job schedulers to execute and manage their workflow pipelines. However, different departments within a large organization may rely on different job scheduling applications for managing their workflows. Without the capability to monitor and manage all or a subset of jobs running on heterogeneous job scheduling applications across the organization at the same time, organizations lack the insight they need to make their workflow pipeline more efficient. The disclosed system and method allows users to monitor jobs or computer applications, including details regarding job execution and service level agreements, running on heterogeneous job schedulers across the organization.

20 Claims, 7 Drawing Sheets

(51) Int. Cl.
*G06F 3/04847* (2022.01)
*G06F 3/0482* (2013.01)

(58) Field of Classification Search
CPC .... G06F 9/4893; G06F 9/5038; G06F 16/951; G06T 11/206
See application file for complete search history.

(56) References Cited

U.S. PATENT DOCUMENTS

| | | |
|---|---|---|
| 7,984,443 B2 | 7/2011 | Ly et al. |
| 8,028,285 B2 | 9/2011 | Ly et al. |
| 8,612,280 B2 | 12/2013 | Shepherd et al. |
| 9,329,951 B2 | 5/2016 | Jaisinghani |
| 9,400,728 B2 | 7/2016 | Pattnaik et al. |
| 9,600,216 B2 | 3/2017 | Ly et al. |
| 10,452,441 B1 | 10/2019 | Subramanian et al. |
| 2006/0190489 A1 | 8/2006 | Vohariwatt et al. |
| 2011/0167112 A1 | 7/2011 | Mazzucco et al. |
| 2015/0026115 A1 | 1/2015 | Gorelik et al. |
| 2017/0228676 A1 | 8/2017 | Cherkasova |
| 2018/0101404 A1* | 4/2018 | Narayanamurthy .. G06F 9/4887 |
| 2020/0104230 A1 | 4/2020 | Hasija et al. |

\* cited by examiner

TOOL FOR VIEWING JOBS MANAGED BY HETEROGENEOUS JOB SCHEDULERS

RELATED APPLICATIONS

This application is a continuation of U.S. patent application Ser. No. 16/741,548, filed Jan. 13, 2020 which is incorporated by reference herein in its entirety.

BACKGROUND

Many organizations rely on workflow or job scheduler tools to launch and manage their workflow pipelines. A job scheduler tool is a computer application for managing the execution of jobs and monitoring the progress and performance of the jobs as they are executed. There are several job scheduler tools available on the market that are designed to operate under specific operating environments.

SUMMARY

Generally, the present disclosure relates to a system and method for viewing jobs managed by heterogeneous job scheduling applications.

One aspect of the disclosure includes: a system comprising: one or more computing environments having one or more crawling applications executable thereon, each of the one or more crawling applications being executable to: scan log files of at least one job scheduling application from among a plurality of heterogeneous job scheduling applications for job execution summary information and service level agreement parameter information associated with jobs running on the at least one job scheduling application; extract the job execution summary information and service level agreement parameter information from the log files; convert the job execution summary information and service level agreement parameter information into a unified format; and store the converted job execution summary information and service level agreement parameter information in a data store; and wherein the one or more computing environments includes: an executable job viewing server including a processor and a memory, the memory storing instructions which, when executed by the processor, cause the executable job viewing server to: respond to a request from a client device for job execution summary information and service level agreement parameter information associated with a plurality of jobs by retrieving the requested job execution summary information and service level agreement parameter information from the data store, the plurality of jobs being managed across two or more of the plurality of the heterogeneous job scheduling applications; and generate a display of the retrieved information, wherein the display includes a selectable visual representation showing job execution progression for each of the jobs of the plurality of jobs over a time window, wherein selecting the visual representation of each of the jobs provides additional information associated with the job's execution, including job execution summary information and service level agreement parameter information.

Another aspect of the disclosure includes: A method comprising: scanning log files associated with a plurality of heterogeneous job scheduling applications, wherein the plurality of job scheduling applications include one or more service level agreement configured jobs and one or more non-service level agreement configured jobs; for each service level agreement configured job, extracting service level agreement parameter information from the one or more log files associated with the respective job; for each non-service level agreement configured job, automatically configuring service level agreement and then extracting service level agreement parameter information from the associated log file; extracting job execution summary information from the log files; storing the extracted job execution summary information and service level agreement parameter information in a data store; receiving a request from a client device for job execution summary information and service level agreement information related to one or more jobs running on the one or more heterogeneous job scheduling applications; retrieving the requested job execution summary information and service level agreement information from the data store; generating a display of the retrieved information, wherein the display includes a selectable visual representation showing job execution progression for each of the jobs of the plurality of jobs over a time window, wherein selecting the visual representation of each of the jobs provides additional information associated with the job's execution, including the job execution summary information and the service level agreement parameter information; and sending the generated display to the client device for display.

Yet another aspect of the disclosure includes: a method comprising: receiving a request from a client device for job execution information associated with a plurality of jobs; retrieving job execution information including job execution summary information and service level agreement parameter information for the plurality of jobs from a data store; generating a display of a user interface comprising: a selectable visual representation showing job execution progression for each of the jobs of the plurality of jobs over a time window, wherein selecting the visual representation of each of the jobs provides additional information associated with the job's execution, including job execution summary information and service level agreement parameter information; one or more selectable options for filtering the retrieved information that is displayed on the user interface; and a selectable option to configure personal preferences that control how the retrieved information is presented on the display.

DETAILED DESCRIPTION

Figure 1:
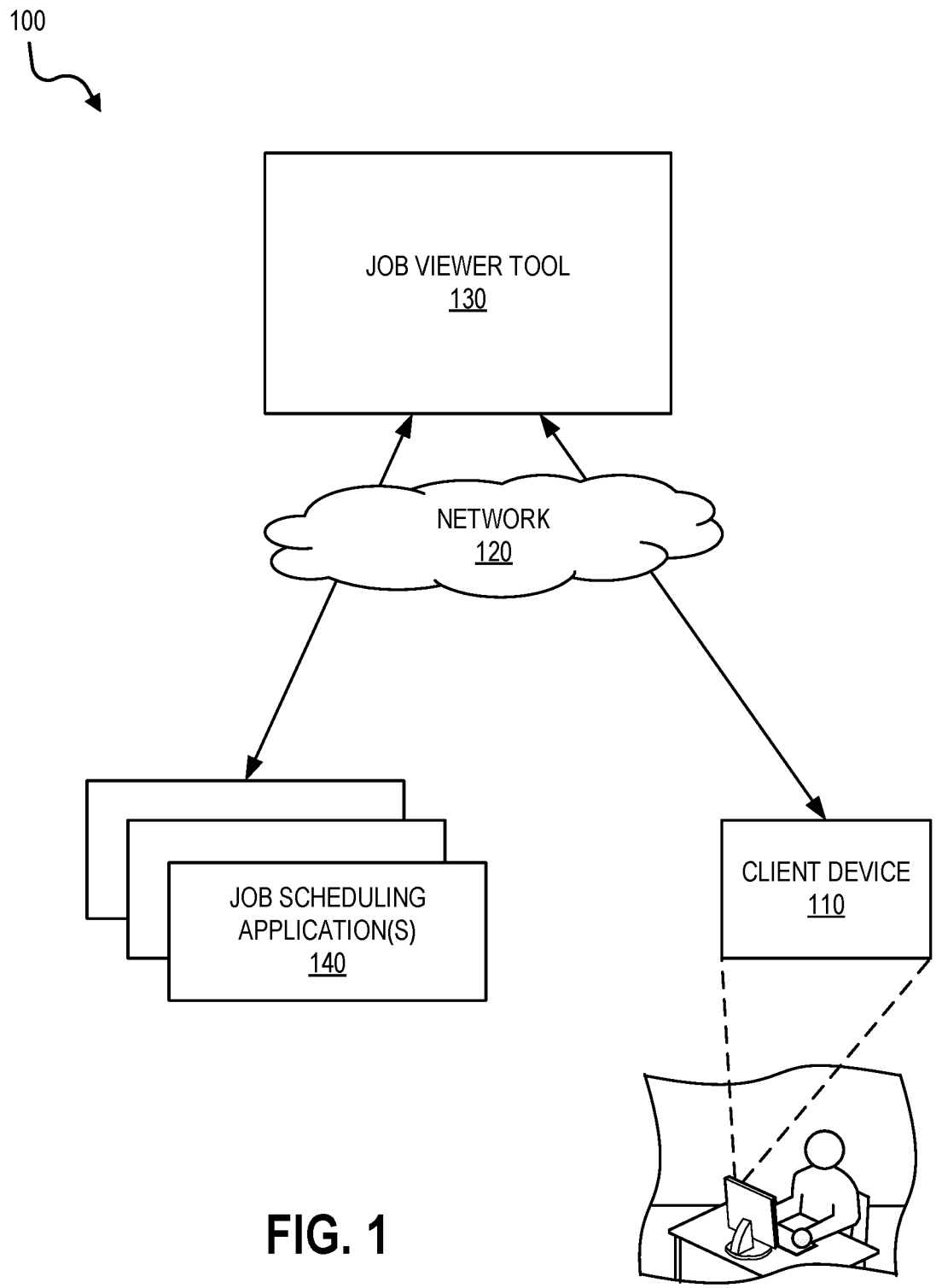
FIG. 1 illustrates an example environment in which aspects of the present disclosure can be implemented.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Organizations rely on workflow schedulers or job schedulers to execute/launch and manage their workflow pipelines. A "job" may include executable files, shell scripts, database procedures, or any other unit of execution that requires computing resources. Large organizations may have multiple departments that each rely on different job scheduling applications to execute and manage a plurality of jobs. Conventional job scheduling applications often embed a monitoring tool to monitor jobs running only on the dedicated scheduler associated with the job scheduling application itself. Without the capability to monitor and manage all or a subset of jobs running on heterogeneous job scheduling applications across the organization at the same time, organizations lack the insight they need to make their workflow pipeline more efficient.

In general, the subject matter of this disclosure relates to a tool, referred to herein as a job viewer tool, that allows users to monitor jobs or computer applications running on heterogeneous job schedulers running on heterogeneous operating environments. In some embodiments, the job viewer tool is a monitoring tool that can allow users to view execution summary details related to a plurality of jobs running on a plurality of job schedulers operating across the organization.

Some embodiments of the job viewer tool can include a modularized, and system-agnostic crawler module. The crawler module can include one or more crawling applications that crawl currently running or previously executed jobs' log files for job execution related information. The design of the crawling application is extendable to support jobs coming from heterogeneous job schedulers. Some embodiments can also include a data store that stores the crawled data from multiple job scheduling systems. The job viewer tool can then access the data store to retrieve relevant job information including job execution summary information and present it to users as a graphical user interface.

In other embodiments, the job viewer tool is a monitoring tool can allow users to view service level agreement information related to a plurality of jobs running on a plurality of job schedulers operating across the organization. In such embodiments, the one or more crawling applications crawl currently running or previously executed jobs' log files for service level agreement parameter information. In some embodiments the job viewer tool includes a service level agreement manager which crawls service level agreement status for service level agreement enabled workflows to enable users to view service level agreement parameter information along with general job execution related information. In other embodiments, the service level agreement manager of the job viewer tool can extend its capabilities to enable service level agreement parameter for non-service level agreement enable workflows in an automatic and configurable fashion. In some examples, the service level agreements are configured based on service level agreements that are associated with similar jobs running on the same or other job scheduling applications within the organization.

In some embodiments, the job viewer tool can include a front-end graphical user interface (GUI) component that allows users to view, monitor and search multiple jobs in a consolidated, scheduler agnostic manner. Jobs from different schedulers can be searched in a search result view and be shown side by side. Some embodiments of the job viewer tool can include a filtering module and a grouping module that allow users to define their own personalized view for the jobs. Some embodiments of the job viewer tool can also include a notification agent that enables job success and failure notifications to register job submitters.

FIG. 1 illustrates an example of a system 100 for viewing execution of jobs across heterogeneous job scheduling applications, including a job viewer tool 130, one or more client devices 110, one or more job scheduling applications 140, both communicatively connected to the job viewer tool through a network 120. The one or more client devices 110 can monitor and manage the jobs running on the one or more job scheduling applications 140 by using the job viewer tool 130. The configuration of the job viewer tool is described in further detail in relation to FIG. 2-4.

In some embodiments, one or more users may operate the one or more client devices 110 and make a request to monitor or manage jobs running on the one or more job scheduling applications 140. In some embodiments, the one or more client devices 110 can take a variety of forms. For example, the client device 110 may be any type of mobile or desktop computing system, and may present the user with a graphical user interface representation of the job viewer tool in a web browser window or as computer application or a mobile application.

The one or more job scheduling applications 140 can be heterogeneous job scheduling applications. In some embodiments, heterogeneous job scheduling applications include different types of job scheduling applications that each generate log files with different formats. In some embodiments, the one or more job scheduling applications 140 may operate on the same computing system. In other embodiments, the one or more job scheduling applications 140 may be running in heterogeneous operating environments. Heterogeneous operating environments include computing systems that run different type of operating systems, including, for example: Windows, Unix, Linux, etc. computing system.

Figure 2:
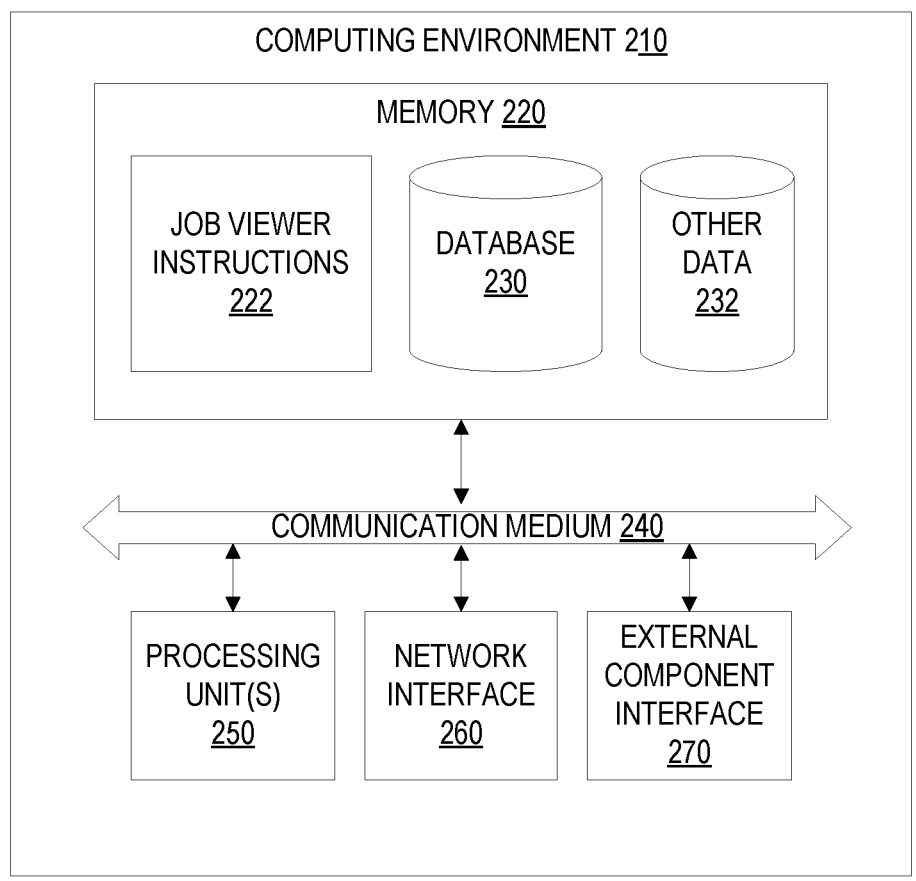
FIG. 2 illustrates an example computing system with which the disclosed systems and methods can be used.

FIG. 2 illustrates an example computing system 200 with which disclosed systems and methods can be used. In an example, the computing system 200 can include a computing environment 210. The computing environment 210 can be a physical computing environment, a virtualized computing environment, or a combination thereof, and useable as any of the computing systems described above in connection with FIG. 1. The computing environment 210 can include memory 220, a communication medium 240, one or more processing units 250, a network interface 260, and an external component interface 270.

The memory 220 can include a computer readable storage medium. The computer storage medium can be a device or article of manufacture that stores data and/or computer-executable instructions. The memory 220 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 220 can store various types of data and software. For example, as illustrated, the memory 220 includes instructions 222 for implementing one or more aspects of the system 100 described herein, as well as database 230 and other data 232. In some examples, the memory 220 can include job viewer data store 320, or instructions for accessing such data.

The communication medium 240 can facilitate communication among the components of the computing environment 210. In an example, the communication medium 240 can facilitate communication among the memory 220, the one or more processing units 250, the network interface 260, and the external component interface 270. The communications medium 240 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 250 can include physical or virtual units that selectively execute software instructions. In an example, the one or more processing units 250 can be physical products comprising one or more integrated circuits. The one or more processing units 250 can be implemented as one or more processing cores. In another example, one or more processing units 250 are implemented as one or more separate microprocessors. In yet another example embodiment, the one or more processing units 250 can include an application-specific integrated circuit (ASIC) that provides specific functionality. In yet another example, the one or more processing units 250 provide specific functionality by using an ASIC and by executing computer-executable instructions.

The network interface 260 enables the computing environment 210 to send and receive data from a communication network (e.g., network 16). The network interface 260 can be implemented as an Ethernet interface, a token-ring network interface, a fiber optic network interface, a wireless network interface (e.g., WI-FI), or another type of network interface.

The external component interface 270 enables the computing environment 210 to communicate with external devices. For example, the external component interface 270 can be a USB interface, Thunderbolt interface, a Lightning interface, a serial port interface, a parallel port interface, a PS/2 interface, and/or another type of interface that enables the computing environment 210 to communicate with external devices. In various embodiments, the external component interface 270 enables the computing environment 210 to communicate with various external components, such as external storage devices, input devices, speakers, modems, media player docks, other computing devices, scanners, digital cameras, and fingerprint readers.

Although illustrated as being components of a single computing environment 210, the components of the computing environment 210 can be spread across multiple computing environments 210. For example, one or more of instructions or data stored on the memory 220 may be stored partially or entirely in a separate computing environment 210 that is accessed over a network.

Figure 3:
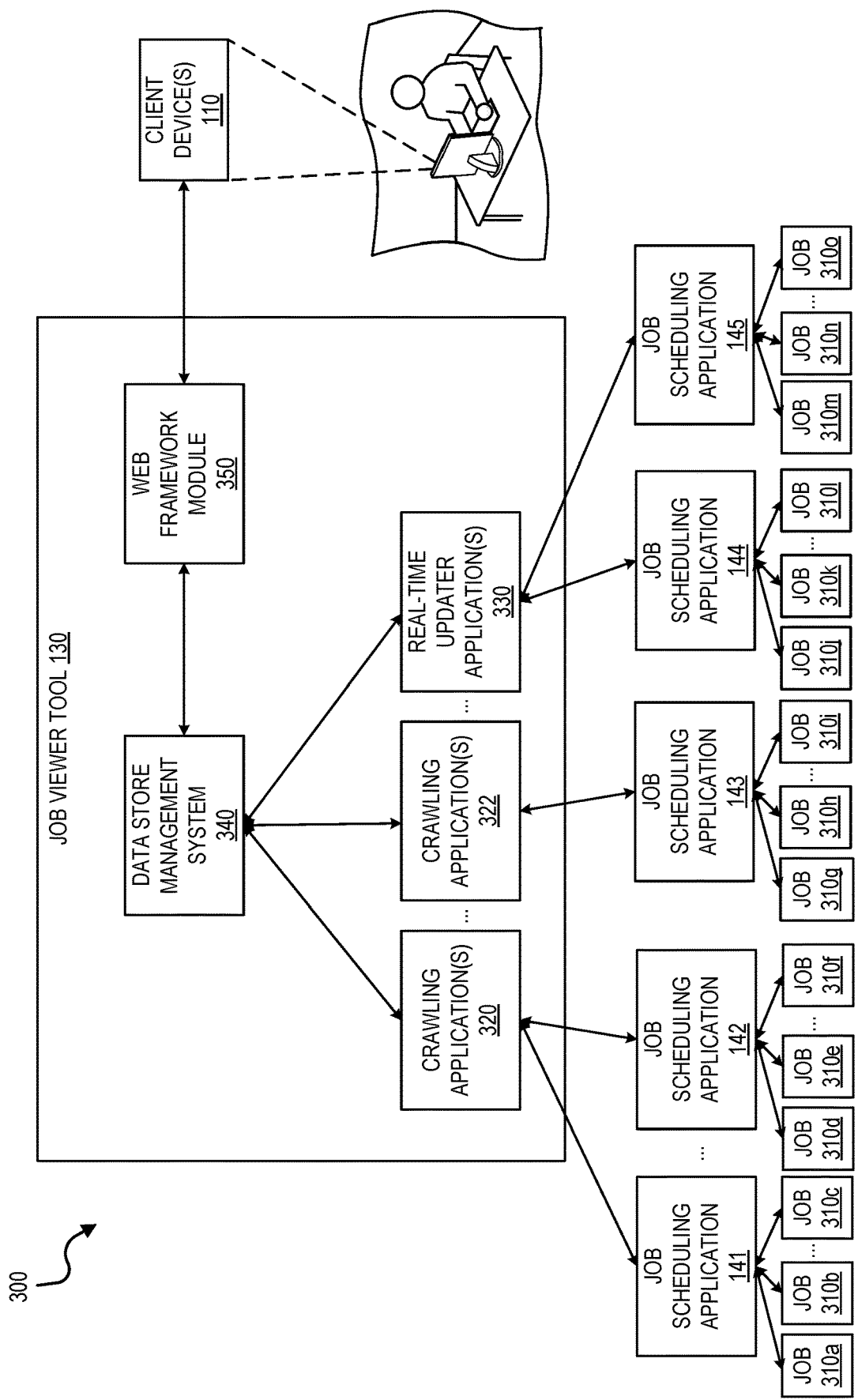
FIG. 3 illustrates an example system for managing and viewing jobs from heterogeneous job schedulers, including the job viewer tool.

FIG. 3 illustrates an example configuration 300 of the system 100. In some examples, one or more computing environments within an organization may be running one or more heterogeneous job scheduling applications 141-145 that each manage one or more jobs 310a-310o. In one example, a job scheduling application is a software application that can schedule and manage the execution of one or more jobs. In computing, a job or a task is a unit of work or unit of execution that uses computing resources. Computer applications and other software programs constantly create and execute one or more jobs.

In some examples, the one or more job scheduling applications 141-145 may be commercially available job scheduling applications that are each configured to operate on a particular computing environment. For example, the job scheduling applications 141 may be configured to operate in a Windows operating environment, whereas job scheduling application 144 may be configured to operate in a Unix operating environment. Furthermore, the job scheduling application may operate differently in executing/managing jobs and workflows and storing/formatting data associated with each job execution.

In some examples, responsibilities associated with each of the job scheduling application 141-145 may include managing the scheduling and execution of one or more jobs 310a-310o by determining when the jobs are submitted for execution, allocating any necessary computing resources that is needed for execution of jobs 310, and storing and sending the results of the jobs 310a-310o to the correct application or software program.

In some examples the job viewer tool is configured to include one or more crawling applications 320, 322 and/or one or more real-time updater applications 330. The configuration 300 of the system 100 may include only crawler application, or only real-time updater applications or a combination of both.

In some examples, the crawling applications 320, 322 can include software applications or software code that can automatically and systematically analyze log files associated with the job scheduling applications 141-145 to retrieve job execution summary data and service level agreement data. In other examples, the job scheduling applications 141-145 may retrieve other types of data. In other examples, if the crawling applications 320, 322 do not have access to log files associated with the job scheduling applications 141-145, the crawling applications 320, 322 can connect to the job scheduling application via an Application Programming Interface (API) and make the request for any necessary job related data. In some examples, one crawling application 320 may crawl the log files of a plurality of job scheduling applications 141-145. In other examples, one crawling application may be associated with a single job scheduling application 141.

In some examples, log files can include files in the job scheduling application file system. In other examples, log files can include job related data collected from API requests or job related data submitted by real time updaters.

In some examples, service level agreements may be an agreement between the entity that creates the job and the job scheduling application regarding one or more performance metrics associated with the job execution that needs to be met by the job scheduling application. For example, service level agreements may include agreements regarding start time miss, end time miss, and duration miss. Other service level agreement parameters are also possible. For example, the service level agreement "start miss" parameter may be an agreement regarding when a job execution start time needs to be. If execution of the job is not started at or before the "start miss" time specified in the service level agreement, the job scheduling application 141-145 marks the service level agreement "start miss" parameter as "failing" in the associated log files.

Examples of execution summary data includes: job name, start time of job, job status, runtime of job, and user who submitted the job. Other job execution summary information parameters are also possible.

In some examples, upon analyzing the log files of the one or more job scheduling application 141-145, the crawling applications 320, 322 may discover that the underlying job was not configured for service level agreements. In such a case, the crawling application 320, 322 may analyze other service level agreement configured jobs within the same or different job scheduling application that have are scheduled for execution, currently executing or executed in the past for similarities. Jobs may be determined to be similar based on one or more of the following factors: jobs submitted by the same computer application, jobs utilizing the same or similar computing resources and jobs submitted by the same user. Determination of similarity can also be based on other parameters. Once other service level agreement configured jobs have been identified as being similar, the crawling application may analyze the service level agreement parameters associated with these similar jobs to identify trends and make a logical determination of what the service level agreement parameters for the present job should be. As such, the crawling application is enables service level agreement for the present job and sets the service level agreement parameters to match parameters of similar jobs.

In some examples, the crawling applications 320, 322 can reformat any data retrieved or extracted from one or more log files associated with one or more job scheduling applications 141-145 such that the data is in a unified format. For example job scheduling application 141 may store log file data in one format and job scheduling application 142 may store log file data in another format. In one example, the crawling application 320 may analyze log files associated with both job scheduling application 141 and 142, retrieve job execution summary data and service level agreement data from both log files and convert both formats into a universal data format.

In some examples, after retrieving and reformatting the data, the crawling applications 320 and 322 send the reformatted data to be stored in one or more data stores managed by the data management system 340. The data management system 340 is described in more detail below.

In some examples, the job viewer tool 130 is configured to use a real-time updater application 330 instead of or in addition to one or more crawling applications 320, 322. The real-time updater application is associated with one or more job scheduling applications. In the example configuration presented in FIG. 3, the real-time updater application is associated with job scheduling application 144 and 145. The real-time updater application 330 is configured to receive job execution summary data and service level agreement parameter data from the associated job scheduling applications 144, 145 in near real-time. The real-time updater application 330 may also receive other types of data. Unlike the crawling applications 320, 322, the real-time updater application 330 does not actively look through job scheduling application 141-145 log files to extract data. The real-time updater only receives data when the job scheduling application 144, 145 makes the updates. The real-time updater application 330 then converts the received data format to a unified format before sending the reformatted data to one or more data stores managed by the data management system 340.

In some examples, the data management system 340 is a system to optimize and manage the storage and retrieval of data from one or more data stores. The data management system 340 interfaces with one or more data stores. In some examples, the data stores are databases. Other forms of data stores are also possible. The data management system 340 receives data from one or more crawling applications 320, 322 and real-time updater applications 330 and stores the received data in the one or more data stores associated with the data store management system 340. In some examples, the data management system 340 also receives requests from the web framework module 350 for data associated with one or more jobs. The data management system 340 processes the request and retrieves the relevant data from the one or more data stores and sends the requested data to the web framework module 350.

One example of the job viewer tool configuration includes a web framework module 350 that manages requests from the one or more client devices 110 by balancing the load on the underlying computing resources and interfaces with a data store management system 340 to retrieve job data that is presented to the client on the client device 110. The web framework module 350 is described in further detail in relation to FIG. 4.

Figure 4:
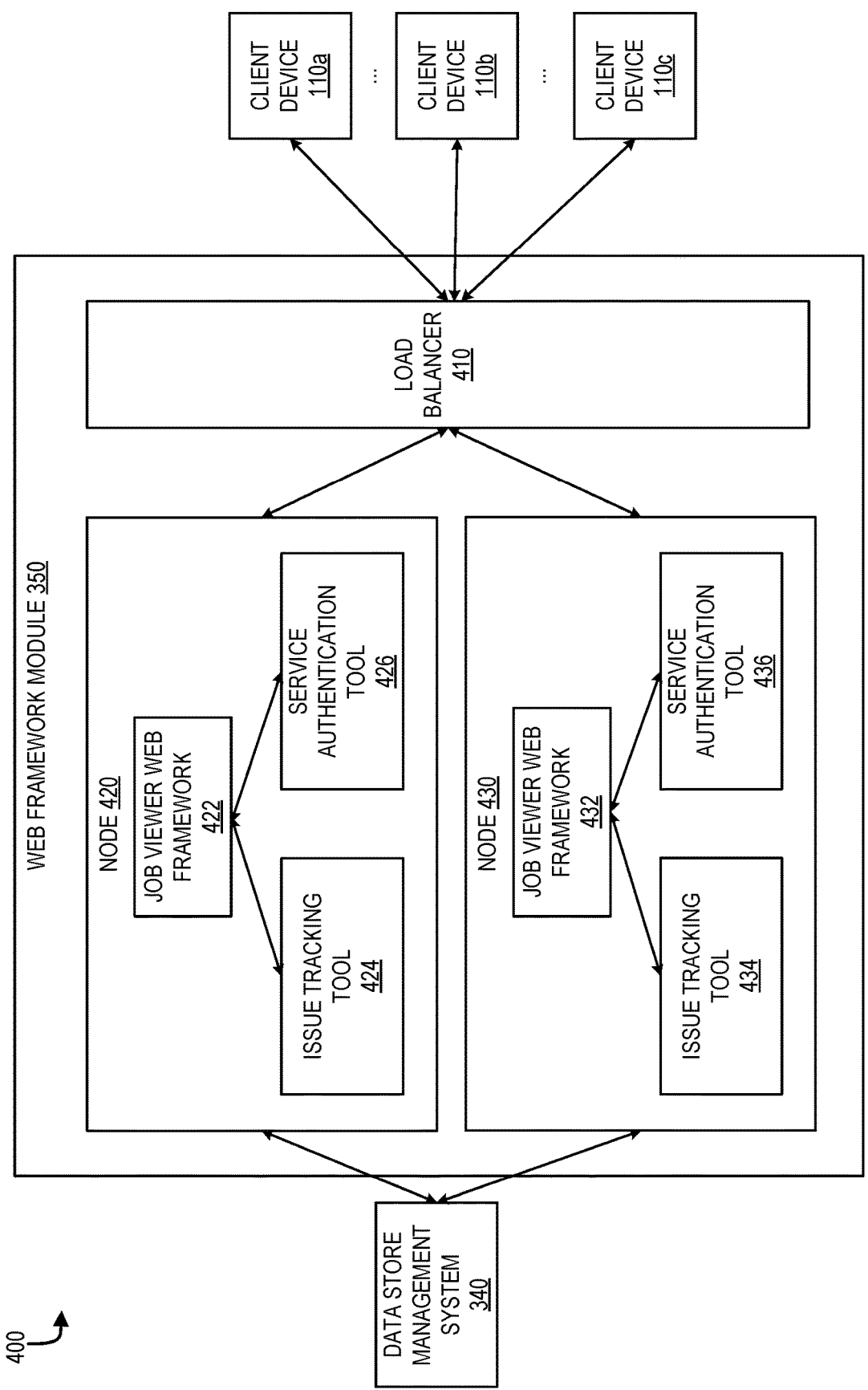
FIG. 4 illustrates an example configuration of the web framework module associated with the job viewer tool.

FIG. 4 illustrates an example configuration 400 of the job viewer tool 130 that focuses on the web framework module 350. The web framework module 350 manages the one or more requests for job data from one or more client devices 110. In some examples, the web framework module 350 includes a load balancer 410. The load balancer 410 helps distribute the requests from client devices 110 across two or more servers or nodes in order to avoid overloading any one node with too many requests from the client devices 110. In the example configuration 400, the load balancer 410 is connected to two nodes 420, 430. In other examples, more nodes are possible. When a job data request is received from a client device, the load balancer 410 analyzes the current computing load on nodes 420, 430 and determines which node is better suited to handle the client request and distributes the request accordingly.

Each node 420, 430 is a server with computing resources to process the client request for job data. In some examples, the node 420, 430 includes a job viewer web framework 422, 432 that helps process the request.

In some examples, the job viewer tool 130 is dispersed across several computing systems. In some examples, a web framework 422, 432 of the job viewer tool 130 is configured within each node 420, 430. The web framework 422, 432 is a software framework used in the implementation of the job viewer tool 130.

In some examples, the job viewer web framework 422, 432 interfaces with one or more pre-built, commercially available and/or open-source tools to help decrease the overhead associated with developing software code for commonly performed software activities. For example, the job viewer web framework 422, 432, interfaces with an issue tracking tool 424, 434, and a service authentication tool 426, 436. In some examples, the issue tracking tool 424, 434, provides a software package that manages and maintains lists of issues and status related to execution of jobs 310a-310o. In some examples, the service authentication tool 426, 436 provides a software package manages the user authentication process when a user launches the job viewer tool 130.

In other examples, the job viewer web framework 422, 432 also manages the client request for job data by processing the request and sending the request to the data store management system 340, described in more detail in relation to FIG. 3.

Figure 5:
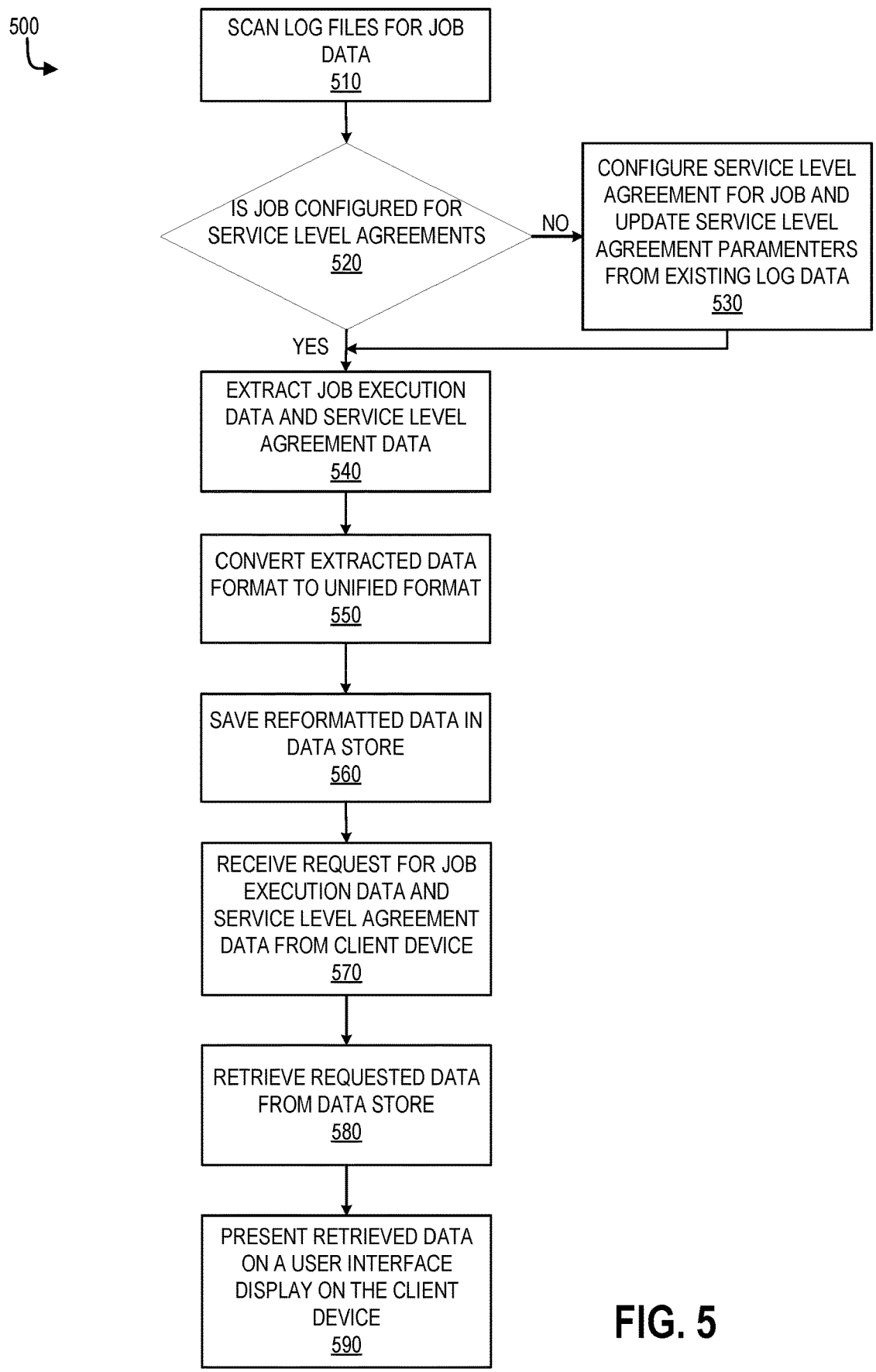
FIG. 5 illustrates a flowchart of an example set of steps executed by the job viewer tool system.

FIG. 5 illustrates a flowchart 500 of an example set of steps executed by the system 100, e.g., using job viewer tool 130. In example operation 510, the job viewer tool 130 uses one or more crawling applications 320, 322 to scan the log files of one or more job scheduling applications 141-145 for job data. In addition, the job viewer tool 130 may also use one or more real-time updater applications 330 to also receive job data from one or more job scheduling applications 141-145. Job data can include job execution summary data, service level agreement data and any other data that may be of interest to the user.

In example operation 520, upon scanning the log files of the job scheduling applications 510, the one or more crawling applications 320, 322 determine whether each underlying jobs executed on the one or more job scheduling applications 141-145 is configured for service level agreements. If a job is not configured for service level agreements, then in example operation 530, the job viewer tool 130 configures the particular job for service level agreement parameters and updates the service level agreement parameters for the particular job based on the data already existing in the log files of the job scheduling application 141-145. The process of configuring service level agreements for a job is described in detail in relation to FIG. 3.

By contrast, if the job is configured for service level agreements already, then in example operation 540, the job viewer tool 130 extracts the job data from the log files for further processing. Job data can include job execution summary data and service level agreement data among other types of data.

In example operation 550, the format of the extracted data from operation 540 is converted to a unified data format. Since the job viewer tool 130 extracts data related to one or more jobs running on one or more heterogeneous job scheduling applications operating under one or more heterogeneous computing environments, the format in which data is stored in the log files varies. Each job scheduling application may have its own format for storing data. The crawling applications 320, 322 and real-time updater applications 330 can interface with the different job scheduling applications 141-145, extract the necessary data and reformat the data into a unified format such that all data is stored in the same format.

In example operation 560, the reformatted data from example operation 550 can be stored in one or more data stores managed by a data store management system 340. Job related data is routinely and automatically updated on the data stores using operations 510-560 as new jobs are executed.

In example operation 570, the job viewer tool 130 receives a request for job execution summary data, service level agreement data or any other data from a client device 110. The job viewer tool uses a load balancer 410 to distribute the request to a node 420,430 that manages the request. An example process of receiving and managing requests from client devices is described in detail in relation to FIG. 4. Additionally, the job viewer tool 130 generates a user interface display as a means for receiving inputs and presenting the output data to the client. The user interface display of the job viewer tool 130 is described in greater detail in relation to FIGS. 6-7.

In example operation 580, the job viewer tool 130 processes the request and retrieves the requested data from the one or more data stores managed by the data store management system 340. In example operation 590, the job viewer tool 130 transmits the retrieved data from the data stores to the client device 110, where it is presented on a user interface display.

Figure 6:
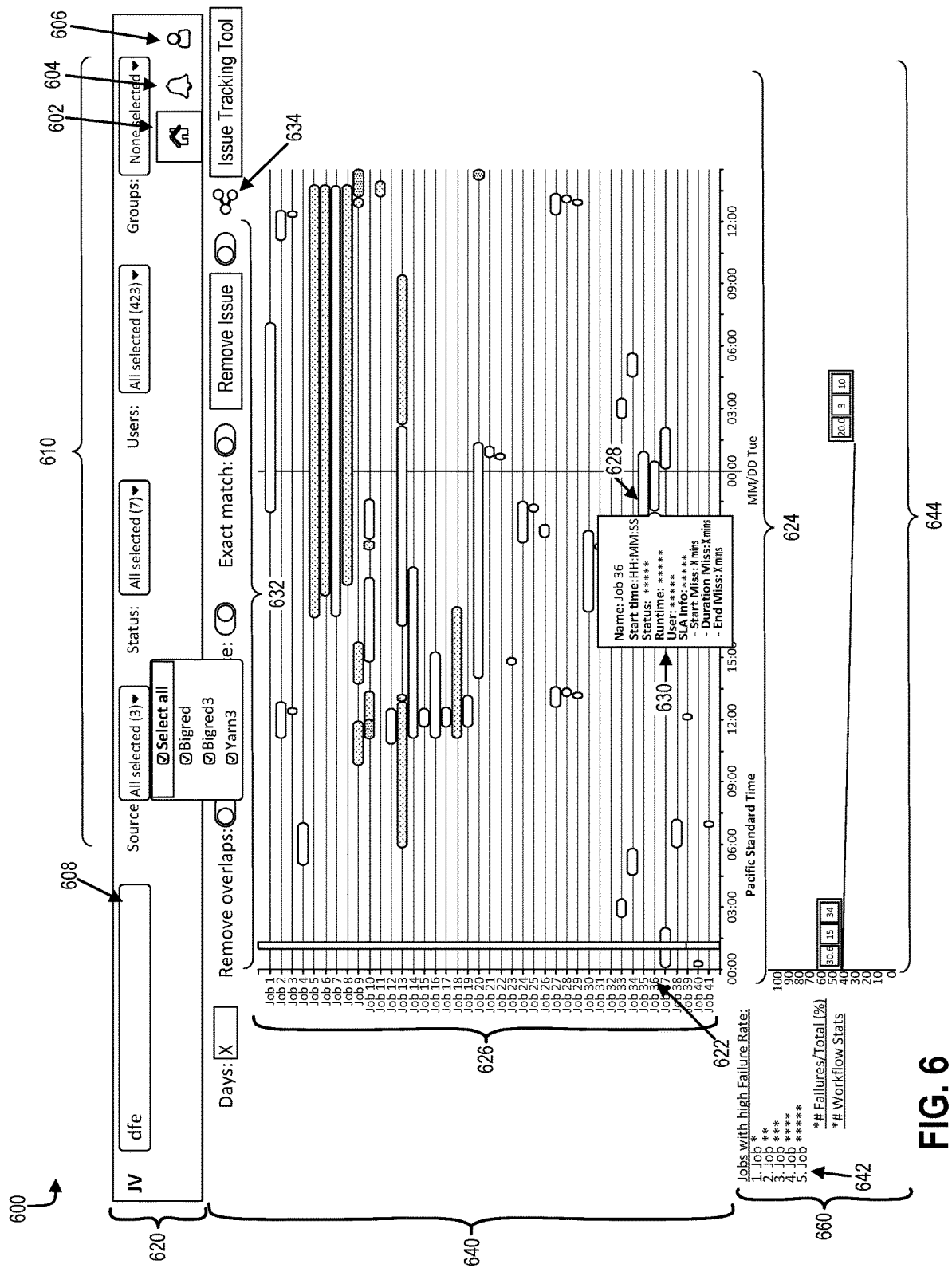
FIG. 6 illustrates an example of a user interface display associated with the job viewer tool.

FIG. 6 illustrates an example user interface display 600 generated or caused to be generated by the job viewer tool 130. In some examples, the job viewer tool 130 generates the user interface display 600. In other examples, the job viewer tool 130 provides data via an API to another system or tool, which then generates the user interface display 600 that is displayed on the client device 110. In an example, the user interface display 600 includes a job viewer tool banner section 620, a job details display section 640, and a job overview section 660. More or less number of sections are possible and sections of the user interface display 600 can display other data than those listed.

In some examples, the job viewer tool banner section 620 includes a "home" button 602, a notifications button 604, a user preferences button 606, a search bar 608, and one or more filters 610. The "home" button 602 is a user selectable button that helps users navigate to the home screen of the user interface display 600 upon selection. During the course of using the job viewer tool 130, users may navigate to other display screens associated with the user interface display 600 and the "home" button 602 provides a quick and easy method for the user to return to the main display screen associated with the user interface display 600.

In one example, the notifications button 604 provides the user with a list of notifications related to the execution of one or more jobs in near real time. In some examples, the notification button 604 can include bubble with a number inside that represents the number of notification messages that are still unread by the user. Clicking the example notification button 604 results in a drop down menu containing all notification message that may still be unread by the user. For example, the notification messages can include messages about job status changes, whether a job completed faster or slower than average, whether the job had any issues associated with it. Other messages are also possible.

In some examples, selecting the user preferences button 606 allows users to navigate to the user preferences page of the user interface display where the user can customize their personal preferences for what jobs and what data is presented on the user interface display 600 and how the display is organized within the user interface display 600. The user preferences page is described in further detail in relation to FIG. 7.

In some examples, the search bar 608 allows users to search for data associated with one or more jobs. The user may search for one or more jobs based on the job name, type of job, user who submitted the job, and the name of the job scheduling application that managed the job. Other ways of searching for jobs are also possible. For example, the user may type in "dse-dd" into the search bar 608. The job viewer tool 130 then accesses the one or more data stores to retrieve all jobs with job names that contain the term "dse-dd." Once retrieved, all jobs matching the search criteria get populated in the job details display section 640.

In some examples, the job viewer tool banner section 620 also includes one or more filters 610. The one are more filters 610 are used to further filter down the jobs that the user is interested in viewing. The one or more filters 610 are implemented using one or more drop down menus that are dynamically populated with options based on the jobs that are currently being viewed by the user. The user may make selections on one or more of the filters 610 to view the job data that they are interested in.

For example, filter 610 may include the following filter criteria: status, users, groups, SLA Status. In an example, if the user searches for jobs with job names containing the term "dse-dd" and there are 30 jobs matching that criteria, the filters 610 may help the user further narrow down the number of jobs that are presented to the user.

Based on the search results from the previous example, the filters 610 may dynamically be populated with one or more options. For example if all 20 of the 30 jobs from the above example were submitted by User A and the rest of the 30 jobs from the above example were submitted by User B, then the filter criteria "Users" would only contain the options "User A," "User B" and "All." The user can then make a selection to filter out the jobs he/she is not interested in. For example, if user selects "User B," then only the 10 jobs containing "dse-dd" in their job name and submitted by User B is displayed on the job details display section 640.

In some examples the job details display section 640 includes a grid like 622 display that presents the execution data associated with the one or more jobs selected by the user. For example, the x-axis 624 of the grid like display 622 may represent time. In one example, the x-axis may span a week. In other examples, the x-axis may represent other criteria or may span different timeframes. For example, the y-axis 626 of the grid like display 622 may represent each selected job, organized by their job names. In other examples, the y-axis may represent other criteria or be organized differently.

In some examples, for each job displayed on the y-axis 626, the grid like display 622 area includes a bar showing when the job was executed over the time span represented on the x-axis 624. In one example, a job 628 has a job name "Job 36" and is visually represented as a bar covering the time frame of when it was executed, in this case, on May 2, 2019. In some examples, the bars representing jobs on the grid like display 622 is also color coded. One color is used to indicate the job status. For example, a green bar may represent a job that succeeded and a red bar may represent a job that failed. Other ways of visually representing jobs is also possible.

In some examples, selecting the bar representing a job may result in additional information regarding job execution summary details and service level agreement information. In the example user interface display 600 presented in FIG. 6, the job execution summary details of job 628 include: Name: Job 36; Start time: HH:MM:SS; Status: ***; Runtime: *; and User: ***. In the example user interface display 600 presented in FIG. 6, the service level agreement information includes: Start Miss: X mins; Duration Miss: X mins; and End Miss: X mins. Other job execution summary details and service level agreement information is also possible.

The example job details display section 640 also includes one or more display options 632 for customizing the display area. In some examples, the display options 632 are toggle switches that can be turned on or off. Other options are also possible. For example, the display options 632 can include the number of days that are included on the x-axis 624. Other options 624 include option to remove overlap, option to reset the display according to the user's preset preferences," only displaying jobs that were an "exact match" to the search entry and option to remove details regarding job issues.

The example job details display section 640 also includes a share button 634. In some examples, the share button 634 allows users to send a link to the user interface display 600 as customized by the user to another user. The link can be sent through email or an instant messaging application. By clicking on the link, another user may be able to launch the job viewer tool 130 where the user interface display 600 already includes the jobs and display settings preferred by the sender. Thus, users may share information about jobs without having to recreate the entire search and settings as another user.

In some examples, the job overview section 660 of the user interface display 600, includes an overview of the jobs that are displayed in the job details display section based on one or more overview criteria 642. For example, the job overview criteria 642 can include number of job failures, jobs with issues, job successes, workflow statistics, and SLA state. Other overview criteria 642 are also possible. Each overview criteria may be color coded so users may easily distinguish between the criteria. In some examples, the job overview section 660 of the user interface display 600, may also include one or more boxes to represent each overview criteria 644 represented over the x-axis 624, wherein each box includes the number of jobs that were executed during the time-frame represented on the x-axis that match the overview criteria 624. In the example user interface display 600, the time frame representing "04/29, Mon" on the x-axis includes a box for the number of failures, in this case represented as "0," a box representing the number of jobs with issues, in this case represented as "0" and a box representing the number of jobs that succeeded, in this case represented as "22." Other ways of visually representing an overview of the displayed jobs are also possible.

Figure 7:
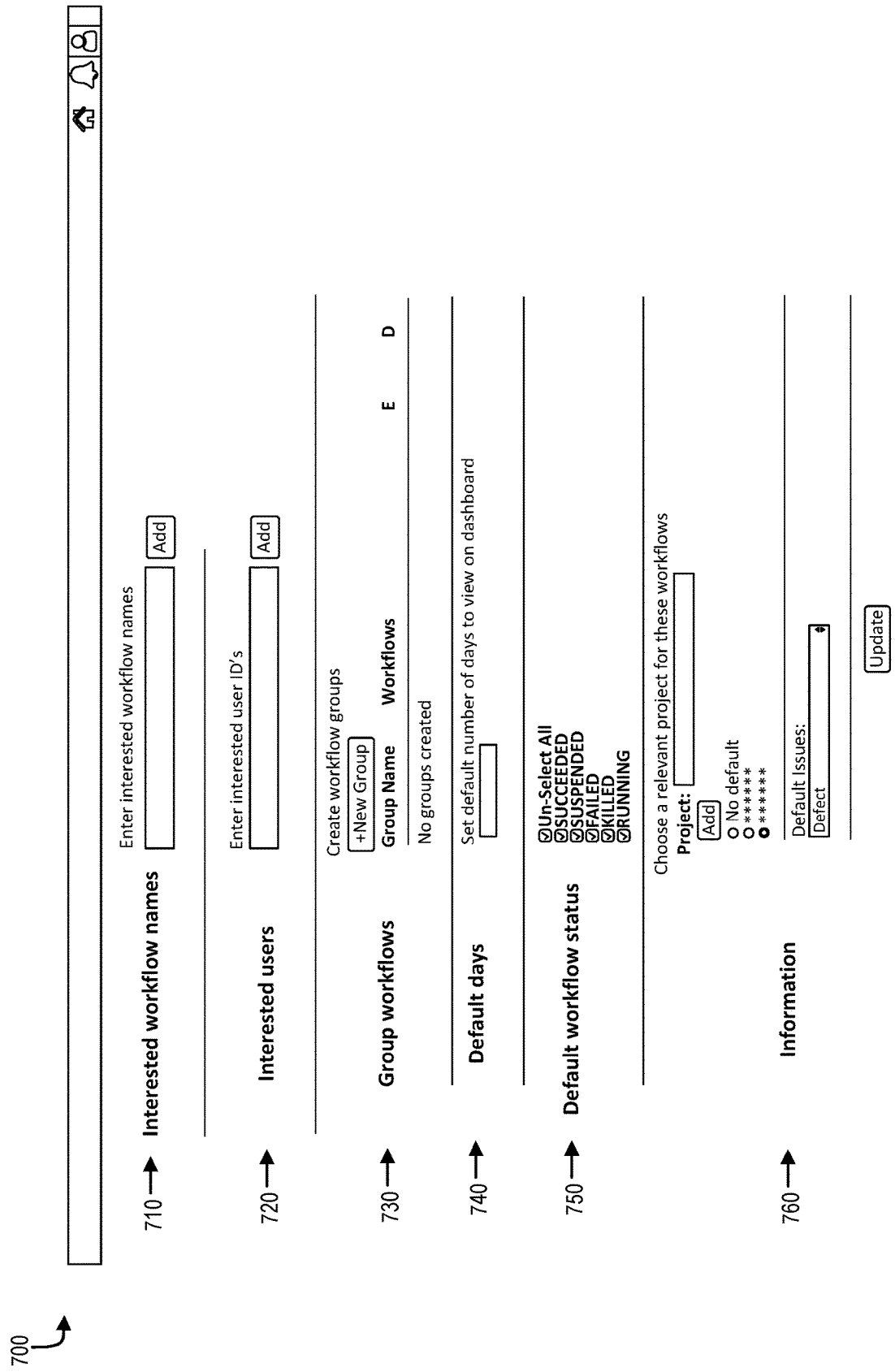
FIG. 7 illustrates another example of a user interface display associated with the job viewer tool.

FIG. 7 illustrates another example user interface display 700 associated with the user preferences page of the job viewer tool 130. The user interface display 700 represents an example user preferences page that the user navigates to upon selecting the user preferences button 606 (as described in relation to FIG. 6). In some examples, the user interface display 700 includes one or more additional or alternate options by which a user may select the jobs to be displayed on the job details display section 640 and customize the associated display settings in addition to or instead of using the search bar 608 and the display options 632. Setting the display preferences 710-760 in the user interface display 700 may allow users to customize the jobs that get displayed on the job details display section 640 of the user interface display 600. The display preferences 710-760 on the user interface display 700 allow the user to customize the default jobs displayed on the user interface display 600 upon the launch of the job viewer tool 130. On the other hand, the search bar 608 and display options 632 offer a temporary method of customizing the user interface display 600 that is not saved when the user exits the job viewer tool 130.

In some examples, the display preference 710 allows users to add, by job name, one or more jobs/workflows to the job details display section 640 of the user interface 600. Users may type in a portion of the job name in the box associated with the display preference 710. The box may turn into a drop down menu with all jobs that include the portion of the job name as typed by the user. The user may then select one or more of the jobs and select the "add" button associated with the box in order to add the jobs to the default job details display section 640 of the user interface display 600.

In some examples, the display preference 720 allows users to add, by user name of the user that submitted the job, one or more jobs/workflows to the job details display section 640 of the user interface 600. Similar to the display preference 710, the display preference 720 may also allow users to type in partial usernames before the box associated with the display preference 720 turns into a drop down menu with all available options to choose from. The user may then select one or more usernames and "add" it in order to add the jobs submitted by users with the selected usernames to the default job details display section 640 of the user interface display 600. User may choose to add jobs based on job names using display preference 710 or based on usernames using display preference 720 or a combination of both.

In some examples, the display preference 730 allows users to create one or more new job/workflow groups. The user can create a job or workflow group that includes one or more related jobs, frequently viewed jobs or any other grouping of jobs. This allows the user to easily load a group of jobs instead of loading one job at a time.

In some examples, the default number of days included in the x-axis of the job details display section 640 of the user interface display 600 can be modified using the display preference 740. The display option 632 includes an option to temporarily alter the timeframe of the x-axis of the job details display section 640, whereas the display preference 740 allows users to set the default preferences that are loaded every time the job viewer tool 130 is launched.

In some examples, the default preference 750 allows the user to alter the default job status that are available as an option on the filter 610 on the user interface display 600. The one or more filter options are described in further detail in relation to FIG. 6.

In some examples, the default preference 760 include one or more default issue management options related to the jobs displayed on the job details display section 640 of the user interface display 600. In one example, users may choose not to display any issues related to the jobs. In other examples, users may choose to only display certain types of issues. Default preferences other than those described 710-760 are also possible.

What is claimed is:

1. A system comprising:
one or more computing environments having one or more crawling applications executable thereon, each of the one or more crawling applications being executable to:
determine if a job on a job scheduling application is configured for service level agreement;
upon determining that the job is not configured for service level agreement, automatically configure service level agreement for the job;
extract a job execution summary information and service level agreement parameter information from log files associated with the job;
convert the job execution summary information and service level agreement parameter information into a unified format; and
store the converted job execution summary information and service level agreement parameter information in a data store; and
wherein the one or more computing environments includes:
an executable job viewing server including a processor and a memory, the memory storing instructions which, when executed by the processor, cause the executable job viewing server to:
respond to a request from a client device for information related to execution of the job by retrieving the requested job execution summary information and service level agreement parameter information from the data store; and
generate a display of the retrieved information, wherein the display includes a visual representation showing job execution information for the job.

2. The system of claim 1, further comprising a plurality of crawling applications, each crawling application specifically configured for one type of job scheduling application among the plurality of job scheduling applications.

3. The system of claim 1, wherein the one or more heterogeneous job scheduling applications execute within the one or more computing environments, and wherein each job scheduling application runs one or more jobs.

4. The system of claim 3, wherein one or more heterogeneous job scheduling applications include: a first job scheduling application that is of a first type and stores log files in a first format and a second job scheduling application that is of a second type and stores log files in a second format that is different than the first format.

5. The system of claim 3, wherein each job scheduling application manages the execution of one or more jobs, wherein managing the execution of a job includes at least one of:
submitting a job for execution, monitoring execution progress of the job, setting up execution priorities and orders, notifying a client of execution progress and orders, and automatically rescheduling jobs upon failure.

6. The system of claim 1, wherein the one or more computing environments comprises a plurality of communicatively connected computing systems.

7. The system of claim 1, wherein automatically configuring service level agreement for the job includes:
identifying one or more service level agreement configured jobs that perform similar types of tasks as the job;
extracting the service level agreement parameter configuration information from the one or more identified jobs;
identifying trends in service level agreement parameter configuration compared to job type; and
creating the service level agreement for the job based on the identified trends.

8. The system of claim 1, further comprising a real-time updater application associated with one of the one or more job scheduling application, wherein the real time updated application is configured to:
receive service level agreement parameter information updates from the associated job scheduling application in at least near real time;
convert the received service level agreement parameter information into a unified format; and
store the converted service level agreement parameter information in the data store.

9. The system of claim 1, wherein the job execution summary information includes: job name, start time, job status, runtime, and user who initiated job.

10. The system of claim 1, wherein service level agreement parameter information includes at least one of start time miss, end time miss, and duration miss.

11. The system of claim 1, further comprising a load balancer configured to manage the computing resources of the system by redirecting the requests from the client devices to one or more nodes within the system.

12. A method comprising:
for each service level agreement configured job, extracting service level agreement parameter information from the one or more log files associated with the job;
for each non-service level agreement configured job, automatically configuring service level agreement and then extracting service level agreement parameter information from the associated log file;
extracting job execution summary information from the log files;
storing the extracted job execution summary information and service level agreement parameter information in a data store;
receiving a request from a client device for job execution summary information and service level agreement information related to one or more jobs running on the one or more heterogeneous job scheduling applications;
retrieving the requested job execution summary information and service level agreement information from the data store;
generating a display of the retrieved information, wherein the display includes a selectable visual representation showing job execution information for the one or more job; and
sending the generated display to the client device for display.

13. The method of claim 12, wherein the one or more heterogeneous job scheduling applications execute within one or more computing environments, and wherein each job scheduling application runs one or more jobs.

14. The method of claim 12, wherein automatically configuring service level agreement for a job includes:
identifying one or more service level agreement configured jobs that perform similar types of tasks as the job;
extracting the service level agreement parameter configuration information from the one or more identified jobs;
identifying trends in service level agreement parameter configuration compared to job type; and
creating the service level agreement for the job based on the identified trends.

15. The method of claim 12, wherein the extracted service level agreement parameter information is converted into a unified format.

16. The system of claim 12, wherein one or more heterogeneous job scheduling applications include: a first job scheduling application that is of a first type and a second job scheduling application that is of a second type.

17. The system of claim 12, wherein the one or more heterogeneous job scheduling applications run on a plurality of computing environments, wherein a plurality of computing environments include: a first computing environment of a first type and a second computing environment of a second type.

18. The method of claim 12, wherein service level agreement parameter information includes at least one of: start time miss, end time miss, and duration miss.

19. A method comprising:
receiving a request from a client device for job execution information associated with a plurality of jobs;
determining if each of the plurality of jobs is configured for service level agreement;
upon determining that a job among the plurality of jobs is not configured for service level agreement, automatically configuring service level agreement for the job;
retrieving job execution information including job execution summary information and service level agreement parameter information for the plurality of jobs from a data store;
generating a display of a user interface comprising:
a selectable visual representation showing job execution information for each of the jobs of the plurality of jobs;
one or more selectable options for filtering the retrieved information that is displayed on the user interface; and
a selectable option to configure personal preferences that control how the retrieved information is presented on the display.

20. The method of claim 19, wherein the service level agreement parameter information includes: start time miss, end time miss, and duration miss.

* * * * *